United States Patent [19]

Elkin et al.

[11] Patent Number: 5,562,181
[45] Date of Patent: Oct. 8, 1996

[54] APPARATUS AND METHOD FOR AUTOMATICALLY PERFORMING ENGINE FLUID CHANGES

[75] Inventors: Paul M. Elkin, Rancho Santa Margarita; Peter M. Elkin, Irvine, both of Calif.; John Workings, Albuquerque, N.M.; David Azarewicz, Tucson, Calif.

[73] Assignee: Caylin Research and Development Corp., Irvine, Calif.

[21] Appl. No.: 468,285

[22] Filed: Jun. 6, 1995

[51] Int. Cl.$^6$ ........................................ F16C 3/14
[52] U.S. Cl. ........................................ 184/1.5; 123/196 R
[58] Field of Search .................... 184/1.5; 123/196 R; 141/98

[56] References Cited

U.S. PATENT DOCUMENTS

| | | |
|---|---|---|
| 1,815,221 | 7/1931 | Sweetland . |
| 2,320,048 | 5/1943 | Parson ........................................ 184/1.5 |
| 2,552,749 | 5/1951 | Tabet ........................................ 184/1.5 |
| 3,216,527 | 11/1965 | Lewis ........................................ 184/1.5 |
| 3,810,487 | 5/1974 | Cable et al. ........................................ 137/351 |
| 4,095,672 | 6/1978 | Senese . |
| 4,095,673 | 6/1978 | Takechi ........................................ 184/1.5 |
| 4,193,487 | 3/1980 | Takeuchi ........................................ 184/1.5 |
| 4,869,346 | 9/1989 | Nelson ........................................ 184/1.5 |
| 5,372,219 | 12/1994 | Peralta ........................................ 184/1.5 |

FOREIGN PATENT DOCUMENTS

| | | | |
|---|---|---|---|
| 2548365 | 4/1976 | Germany ........................................ 184/1.5 |
| 0016115 | 1/1988 | Japan ........................................ 184/1.5 |
| 0057808 | 3/1988 | Japan ........................................ 184/1.5 |

*Primary Examiner*—Thomas E. Denion
*Attorney, Agent, or Firm*—Klein & Szekeres

[57] ABSTRACT

An environmentally sound apparatus and method for automatically extracting and injecting lubricating fluids is disclosed. The apparatus includes one or more sources of lubricating fluid, a waste fluid tank, and a source of compressed air, all with associated fluid-level sensing status switches, as well as other status switches for vacuum and low battery voltage. Signals from such status switches and from a fluid flow monitoring pulse meter are relayed to a central processing unit which operates through a front control panel to control a valved single pump and a plurality of valved lines in fluid communication with the single pump, and to display error messages to front control panel indicators when appropriate. Waste fluid is evacuated, from a crankcase oil pan of an internal combustion engine through one computer-determined arrangement of open valves and fluid lines, to the waste tank. Fresh fluid is injected, from one of the fluid sources through another computer-determined arrangement of open valves and fluid lines, to the oil pan. Quantities of both evacuated waste fluid and injected fresh fluid are at least periodically monitored and displayed. The system is also automatically cleared and purged of residual fluid. Evacuation, injection and clearing operations are initiated by an operator and executed automatically through status-monitored sequences controlled by the central processing unit. All fluid exchange sequences are performed without exposing the operator or the environment to either waste or fresh fluid.

25 Claims, 12 Drawing Sheets

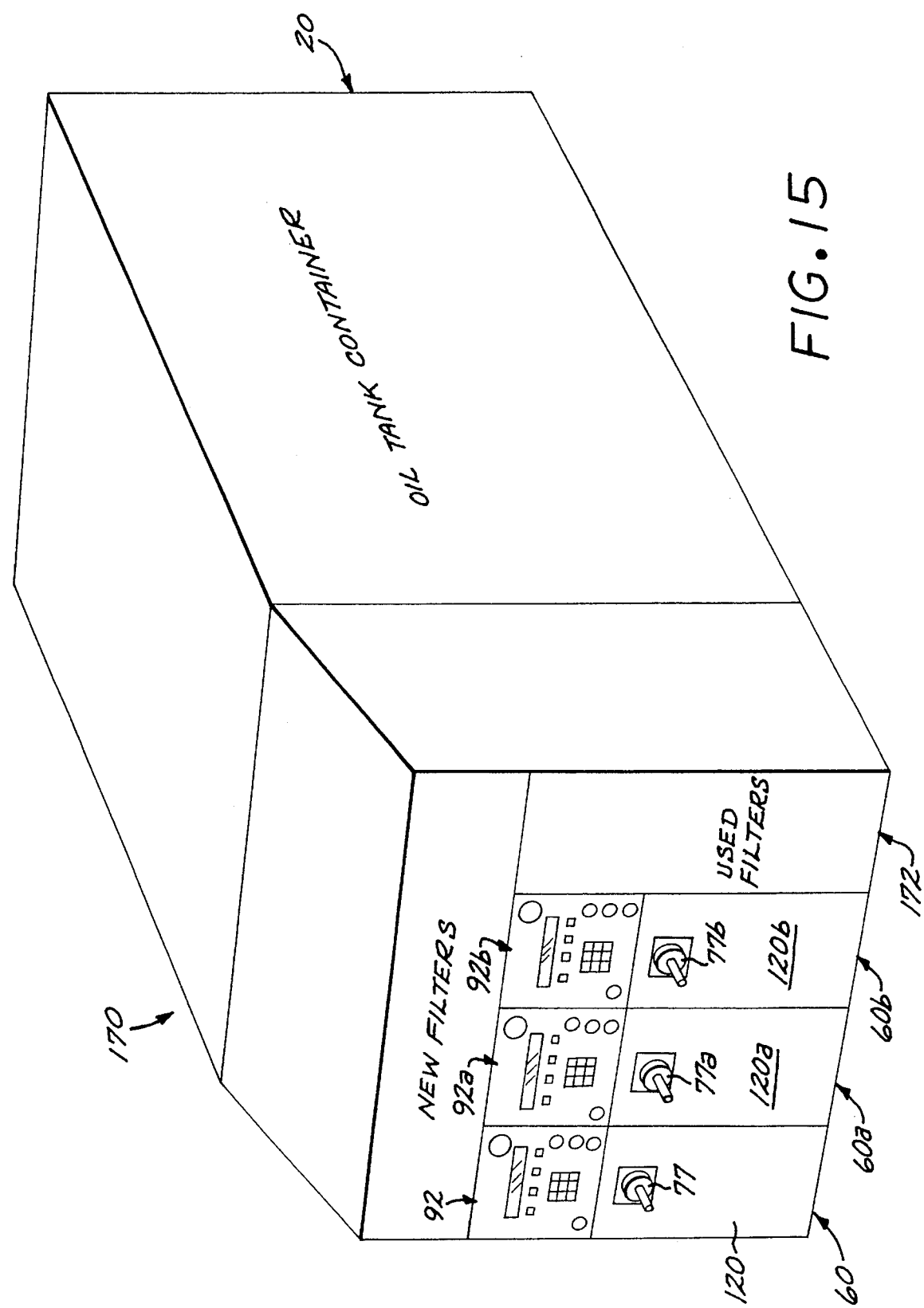

APPARATUS AND METHOD FOR AUTOMATICALLY PERFORMING ENGINE FLUID CHANGES

BACKGROUND

1. Field of the Invention

The present invention relates generally to the field of apparatus and methods for changing motor oil in internal combustion engines. More specifically, the invention relates to a computer-controlled system for removing used oil from a vehicle engine, supplying the engine with fresh oil, and purging the system of residual oil, all in an environmentally protective manner.

2. Description of Related Art

Metal parts that make contact with one another within internal combustion engines are lubricated by lubricants, generally called "motor oils" which must be replaced at regular intervals to optimize engine performance and to prevent damage or malfunction from abrasive or corrosive contaminants in the lubricant. Traditionally, the task of replacing used motor oil with fresh motor oil has involved: 1) manually removing a crankcase oilpan plug from beneath an engine; 2) gravity draining the used oil into a receptacle exposed to the ambient environment; and 3) refilling the crankcase by gravity through an oil filling port, either from a number of small containers, or from a fresh oil bulk dispensing tank or barrel.

This operation is often messy, time consuming, and environmentally unsound, exposing the used oil to the environment. Furthermore, changing oil in this manner often leaves a substantial residual quantity of used oil in the crankcase, since the gravity draining is inefficient, especially if the used crankcase oil has become excessively thickened due to overlong use. Still further, both the filling and draining operations often expose service station personnel to contact with the oil, an occurrence that is perceived to pose some health risks, especially in connection with used oil.

Various attempts have been made in the prior art to render the foregoing task less messy, less time-consuming, less environmentally hazardous and generally safer and more convenient. Most of these attempts have employed some form of suction device to extract the used oil, and some have also provided for a pressurized injection of fresh oil. The various prior art oil changing systems, however, suffer from one or more drawbacks, such as inadequate or nonexistent automation, non-portability, poor internal system status checks, minimal environmental safeguards, or the inability to directly monitor and/or control the quantity of oil extracted or supplied.

For example, U.S. Pat. No. 3,216,527—Lewis discloses an engine crankcase oil changing system that employs suction for oil extraction, and pressurized air for supplying fresh oil through the dipstick tube of the engine. This system requires the permanent installation of some parts on the engine itself, and it employs separate devices for vacuum generation and for pressurizing the fresh oil flow. There is no measurement of the quantity of spent oil extracted, nor are status checks provided during any of the operations.

U.S. Pat. No. 3,810,487—Cable et al. discloses a truck mounted mobile oil changing system that employs air pressure to inject fresh oil into an engine's crankcase. While the system is capable of supplying a plurality of engine fluids from multiple sources, both mounted on the truck and remote from it, there is no significant degree of automation. Spent oil is drained from the vehicle by gravity flow into a waste oil receptacle, exposing the spent oil to the environment.

U.S. Pat. No. 5,372,219—Peralta discloses a reversible pump driven system for extracting and adding motor oil to an engine, employing a single multiway valve for directing fluid flow. The system is mounted within the engine compartment of the vehicle, and thus can be used only for the engine in that vehicle. There is no provision for measuring fluid flow, and thus no part of the extraction or refilling process is automated on the basis of the volume of the oil delivered or removed. Nor are there any built-in means for automatically checking fluid levels in supply tanks or waste tanks, or for testing for vacuum presence or low voltage level, during operation of the system.

There has thus been a long-felt, but as yet unfilled need for an engine oil changing system that employs a single pump to both extract used oil and to inject fresh oil, and that automatically and directly measures fluid flow both into and out of the engine in real time to control both the filling and extraction functions. There is a further need for such an oil changing system that can be made either mobile or stationary, and that performs the entire oil exchange operation without exposure of the oil to the environment, and without exposing the operator to the used oil. There is a still further need for such an oil changing system that incorporates computer controlled operational and status checks and automated error messages to assure the efficient and successful completion of the oil exchange operation.

SUMMARY OF THE INVENTION

It is an object of this invention to provide a method and apparatus for automatically changing engine lubricating fluid that overcome the foregoing deficiencies.

It is a further object to provide a mobile, computer controlled, single pump oil exchange apparatus that directly measures fluid quantity in real time during both evacuation from and injection into an engine, and automatically feeds back such real time measurements to determine system operation.

It is another object to provide an apparatus and method that performs engine oil exchange with no contact of the oil with an operator and no exposure of the oil to the environment.

It is yet another object to provide such an oil change system incorporating substantial computer controlled operational and component status checks and error messages to assure efficient and successful completion of the oil transfer functions.

The present invention involves a computer-controlled apparatus and method for changing lubricating fluid in an internal combustion engine. The invention is for use with an engine having a crankcase oil pan with a drain plug orifice and a dipstick orifice. The invention includes a container module housing one or more fresh oil tanks and at least one waste oil tank, as well as fluid level-sensing status switches and a source of atmospheric air. Signals from such switches and from sensors for compressed air pressure, vacuum, and battery voltage are relayed to a central processing unit that is located in a service module installed adjacent to the container module.

Also within the service module is a network of valve-controlled conduits in fluid communication with 1) an external source of compressed air, 2) the container module tanks and a source of atmospheric air, and 3) a reel hose connected via a selected one of a group of connector flow lines to the engine crankcase. For example, one connector flow line is adapted for use with a replacement plug fitted into the threaded drain plug orifice of the oil pan, while a different connector flow line is adapted for insertion into the engine dipstick orifice. A single compressed air-powered pump within the service module drives fresh oil, waste oil and air through the system. The network of conduits and valves is arranged so that each such fluid in turn courses through the pump in the same direction, and is routed to and from different locations by the automatic opening and closing of appropriate valves.

The flow of both fresh oil and waste oil is continuously monitored by a pulse flow meter. Signals from the pulse flow meter and from the previously mentioned status switches and sensors are relayed to the central processor unit which operates through a service module front control panel to control the pump and valves, and to display indications of system performance to an operator.

In operation, an operator initializes the computer (central processor unit) from the front control panel by selecting a fresh oil tank and setting a quantity of oil to be evacuated from and/or injected into the crankcase. The operator then chooses either fully automatic operation or one or more manual operations with automated sequences.

If fully automatic operation has been selected, the computer commences status checks for low fresh oil in the selected fresh oil tank, full waste tank, low compressed air pressure, low battery voltage, and presence of subatmospheric pneumatic pressure (vacuum) in a pump input conduit, displaying appropriate error messages for operator attention as necessary. If all status checks are normal, the computer executes an evacuation sequence, extracting quantity-monitored spent oil from the crankcase, and then executes an injection sequence (including a clear sequence), injecting quantity-monitored fresh oil. The computer then signals the operator through audible and visible control panel indicators that the operation is complete.

If only evacuation is desired, the operator selects Manual-Evacuate. The computer initializes oil quantity to zero, performs all status checks except "low fresh oil", executes the same evacuation sequence described above for automatic operation, and signals completion of the Manual-Evacuate operation.

If only injection is desired, the operator selects Manual-Inject. The computer checks for oil quantity initialization and pauses the system for operator input if no initialization has occurred. All status checks except "waste tank full" are performed, and the same injection sequence referenced for automatic operation is performed, followed by the completion indications.

If only clearance of the system lines is desired, the operator selects Manual-Clear. The computer checks for low air pressure and low battery voltage, then performs the same clear sequence referenced for automatic operation, signalling completion when done.

These and other features of the present invention will become apparent from the following Detailed Description of an Exemplary Embodiment when taken in conjunction with the claims and drawing figures herein described.

BRIEF DESCRIPTION OF THE DRAWINGS

FIG. 1A is an enlarged pictorial view illustrating details of connector and connector line elements of the apparatus of FIG. 1;

FIG. 15 is a pictorial perspective view of an assembled mobile unit illustrating the placement of modules in an exemplary embodiment of the present invention.

DETAILED DESCRIPTION OF AN EXEMPLARY EMBODIMENT

Figure 1:
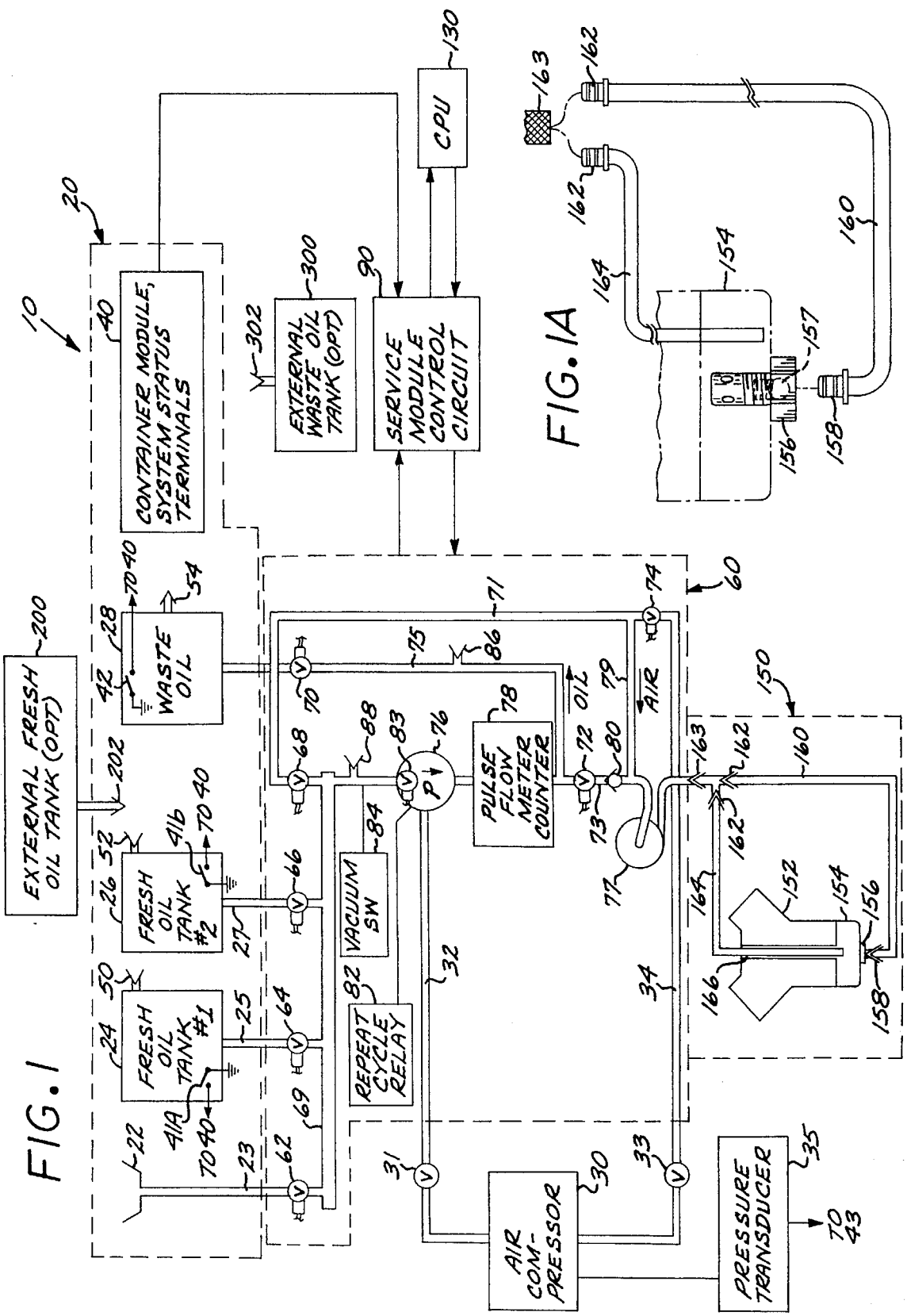
FIG. 1 is a pictorial diagram of a computer controlled lubricating oil extraction and injection apparatus illustrating fluid flow and control features of the present invention.

An overview of an embodiment of the present invention is presented in FIG. 1, wherein a computer controlled apparatus 10 for changing oil is illustrated.

Structural Arrangement

The physical configuration of the apparatus 10 will be described in this section, as necessary foundation for the operational control and fluid flow description to follow in the next section. Two major modules, a container module 20 and a service module 60 are integrated to perform vacuum evacuation and pressure injection of lubricating fluid in a monitored and environmentally sound automated process. Three identical service modules 60, 60a and 60b, or more, may be installed side by side and forward of a container module 20 in an enclosure 170 (FIG. 15) and mounted in a van or truck (not shown), or on a stationary surface. To facilitate understanding of the present invention, the configuration and operation of a single service module 60 will be discussed, with the understanding that the discussion applies equally to the other service modules 60a and 60b that may be in the system.

The container module 20 includes three fluid inputs which supply oil or air to the service module 60, and one waste oil tank 28 which receives spent oil from the service module 60. Two of the three inputs are first and second fresh oil tanks 24 and 26 respectively, and the third is a conduit terminus 22 that is open to atmospheric air. The sources 22,24,26 are connected by conduits 23, 25 and 27 respectively, to valves and an input manifold 69 in the service module 60, as will be described below. The conduit 23 is an atmospheric air conduit, while the conduits 25 and 27 are first fresh oil tank and second fresh oil tank conduits, respectively. It is understood that the invention can employ only a single fresh oil tank, or more than two, as desired.

Figure 2:
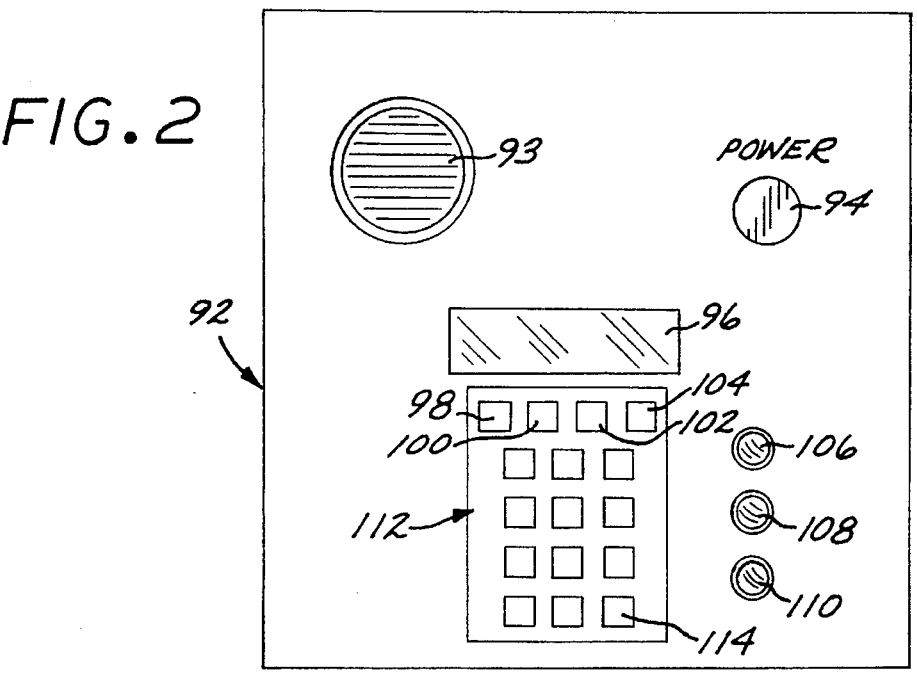
FIG. 2 is a front elevation view of a control panel of the present invention illustrating a functional layout of switches and indicators.

The waste tank 28 is supplied from the service module 60 through a waste conduit 75. The container module 20 also includes a number of status monitoring switches providing alarm signals to an associated status terminal strip (illustrated in FIG. 13) within the container module 20, and a cable for providing the alarm signals to a central processing unit 130 physically mounted on the rear side of a service module front panel 92 (FIG. 2). The status monitoring switches include a first float switch 41a to sense a low fluid condition of the first fresh oil tank 24, and a second float switch 41b providing the same function for the second fresh oil tank 26. A third float switch 42 is installed in the waste tank 28 to sense a full tank condition of the waste tank 28. These tank sensor switches are conventionally available, and may be obtained from the Madison Co. as Model M8700. Operation of the status monitoring switches will be described more fully in conjunction with the discussion of system operation below.

The service module 60 houses the conduits through which oil and air fluids are channeled; a single pump 76 for propelling such fluids; a pulse flow meter 78 to measure and report the flow of fluid oil for both injection and evacuation operations; a vacuum switch 84 to assure that, in Evacuation operations, the flow meter 78 operates only when fluid is flowing in the pump 76; valves to direct fluid flow for the various operations of the system apparatus; and a central processing unit (CPU) 130 working through service module control circuits 90 and the control panel 92 to automatically control the valves and pump action.

The pulse flow meter 78 is of conventional design, and includes a cam-operated microswitch (not shown) that is tripped as fluid flows through the meter. A commercially available flow meter of this type is sold by the Lincoln Co. of St. Louis, Mo. as Model 84458. Each tenth of a unit volume (quart or liter) produces one count, i.e., one closing of the microswitch. The volume of flow as signalled by the pulses from flow meter 78 is relayed to the CPU 130 where the pulses are summed to produce a continuous display of oil volume as described below. Volume measurements are displayed in quarts or liters to the nearest tenth on a visual display window 96.

The novel layout of the fluid conduits advantageously allows the use of only one pump 76, propelling fluids in just one direction, to perform both vacuum extraction and positive injection functions. The pump 76 performs extraction by applying subatmospheric pneumatic pressure, and injection by applying positive hydraulic pressure as will be described below. The pump 76 also applies positive pneumatic pressure as well, to flush the system for subsequent activity. The pump 76 may be, for example, a compressed air actuated diaphragm pump, Model M1/POE/BN/NB/KB as supplied by Wilden Company of Riverside, Calif., having a ten GPM capacity and an internal 12 Volt DC solenoid-switched valve 83. A pump rated for equivalent metric capacity is also available from Wilden. The pump valve 83 is controlled by a repeat cycle relay 82, seen in more detail in FIG. 12, which permits the pump 76 to have preset "on" and "off" times and to run at a constant preselected rate, while preventing cavitation when the pump is dry.

An air compressor 30, which may be mounted within a transport van adjacent to the cabinet that houses the service modules 60 and container module 20, supplies compressed air through a pump air supply system conduit 32 including a first regulator 31 to actuate the pump 76, and also through a purge air supply conduit 34 and a second regulator 33, to clear the system, as will be described later. The compressor 30 may deliver 80 to 120 psi pressure, with 60 psi considered to be an unacceptably low level reportable, by means such as an air pressure transducer 35, to the CPU 130 as an input signal for generating an alarm by the CPU.

Fluid input to the pump 76 comes directly from the input manifold 69 and an evacuation conduit 71. For Evacuation operations, fluid input from the evacuation conduit 71 is monitored by the vacuum switch 84, and exits the pump 76, where its volume of flow is measured by the flow meter 78. The pulse flow meter 78 counts one pulse for each one-tenth of a quart of fluid flow, and relays the count to the CPU 130 for comparison with a preselected volume input from a keypad 112 on the control panel 92 (FIG. 2). The flow meter 78 may also be calibrated for deciliter volumetric pulses, where metric volume units are employed.

The manifold 69 accepts input from the container module 20 through the air conduit 23 and the fresh oil conduits 25 and 27, controlled by valves 62,64 and 66, respectively. All fluid conduit valves in the service module 60, including those to be described below, are 12 Volt DC two way direct acting solenoid valves such as the Model PAGP400G23MM12D supplied by Parker-Hannefin of Elyria, Ohio. The evacuation conduit 71 that completes the input set to the manifold 69 is controlled by an evacuation control valve 68.

Fluid output from the pump 76 and the flow meter 78 branches in one of two directions: either through an injection control valve 72 controlling an injection conduit 73 for Injection operations, or into the waste conduit 75 leading to the waste oil tank 28 and controlled by a waste flow control valve 70 for Evacuation operations. After flowing through the injection control valve 72, fluid in the injection conduit 73 flows through a check valve 80 during the Injection operation directly into a reel hose 77 leading out ultimately to an engine 152. As mentioned above, the compressor 30 supplies compressed air through a purge air supply conduit 34. The purge air supply conduit 34 communicates with a purge/evacuate conduit 79 through a solenoid-actuated compressed air control valve 74. The purge/evacuate conduit 79, in turn, communicates between the evacuation conduit 71 downstream from the compressed air control valve 74 and the injection conduit 73 downstream form the check valve 80. When the evacuation control valve 68 and the compressed air control valve 74 are closed, as will be described below, air is trapped within the purge/evacuate conduit 79, thereby blocking the entry of oil into the purge/evacuate conduit 79 during the injection process that will be described below.

For either a mobile configuration or a stationary configuration of the service module 60, an optional bulk source 200 of new oil and an optional reservoir 300 for spent oil, (both of the latter being external to the truck or van, if any, transporting the apparatus 10), may be connected to the container module 20 and the service module 60. The external bulk oil source 200 may be connected, via a bulk source quick disconnect fitting 202 mating with a selected fresh oil tank quick disconnect connector 50,52 to fill either of the fresh oil fluid tanks 24,26 respectively, using an external pump (not shown) for such fluid transfer. The external waste oil reservoir 300 may be similarly connected via a waste oil reservoir quick disconnect fitting mating with a quick disconnect connector 54 on the waste oil tank 28 for evacuating the internal waste tank 28 employing an external pump.

Alternatively, it may be desirable to employ the service module pump 76 instead of an external pump to effect the foregoing fluid transfers. For replenishing the fresh oil tanks 24,26 from the external bulk source 200, the bulk source fitting 202 is connected to an oil input quick disconnect fitting 88 upstream of the pump 76, and an oil output quick disconnect fitting 86 downstream of the pulse flow meter 78 in the waste conduit 75 is connected to a selected one of the fresh oil tank fittings 50 or 52. To extract spent oil from the internal waste tank 28, the waste tank fitting 54 is connected to the oil input fitting 88, and the oil output fitting 86 is connected to the waste reservoir fitting 302.

When the service module pump 76 is used for such fluid transfer between internal and external containers, certain float switches (not shown) in the internal tanks are monitored in a manner similar to those described below in the Operation and Fluid Flow section of this specification. These tank transfer fluid float switches include a "fresh oil full" switch in each of the fresh oil tanks 24,26, and a "waste tank low" switch in the waste oil tank 28, to signal completion of transfer of fluid into a fresh oil tank or out of the waste oil tank.

The service module pump 76 may also be employed to evacuate fluid directly from the engine 152 to the external waste reservoir 300, or to inject fresh oil from the external bulk oil source 200 directly into the engine 152. Such direct evacuation is effected by connecting the oil output fitting 86 to the external reservoir fitting 302, while such direct injection is effected by connecting the external bulk source fitting 202 to the oil input fitting 88. A distinct advantage of employing the pump 76 instead of an external pump for such transfers involving an external source or reservoir is the capability of utilizing the pulse flow meter 78 to display the oil quantity being transferred for both evacuation and injection.

Fluid flow between the service module 60 and the engine 152 to be serviced takes place through a reel hose 77, which has a quick-disconnect fitting 163 at its free end. Access to the engine crankcase 154 for either evacuation or injection is achieved through one of two types of quick-disconnect connector lines shown in FIG. 1A. A hose connector line 160 is used in conjunction with a replacement drain plug 156 having a positive closure for retaining oil in the crankcase, such as a spring loaded ball valve 157. The hose connector line 160 has a proximal end fitting 162 that mates with the reel hose quick-disconnect fitting 163, and a distal end fitting 158 that is inserted into the replacement plug 156, opening the ball valve 157 to allow ingress and egress of crankcase fluid. For access from above the crankcase 154, a plastic tubing connector line 164 is employed instead of hose connector line 160. The connector line 164 has a proximal end fitting 162, identical to the hose connector line fitting 162, which mates in like manner with the reel hose quick-disconnect fitting 163. The distal end of the tubing 164 connector line is worked into and through a dipstick orifice 166 to reach the crankcase 154. The tubing 164 may be, for example, an approximately three to four feet (0.9 to 1.2 meter) length of polypropylene material having an inner diameter of from about ⅛" to ³⁄₁₆" (approximately 0.3 to 0.5 cm).

It will be appreciated from the foregoing discussion that the physical flow of fluid oil is conducted in an entirely closed system, involving no environmental exposure to waste or fresh oil. Once either of the connector lines 160 or 164 is in place, spent oil from the crankcase 154 is evacuated through the reel hose 77, the evacuation line 71, the pump 76 and the waste line 75 to the waste tank 28 without any oil contact with an operator or any external spillage. Similarly, fresh oil is injected from either the tank 24 or the tank 26 through the manifold 69, the pump 76 and the injection line 73 to the reel hose 77 and out to the engine 152 in a fully contained, environmentally isolated passage. It should also be apparent that access from the reel hose 77 to the crankcase 154 may be gained through a typical oil filler channel (not shown) via any suitable oil filler cap connector for both evacuation and injection of oil.

FIG. 15 presents a view of a typical truck or van configuration of the system apparatus 10 installed in an enclosure 170. Two additional service modules, 60a and 60b are mounted adjacent the service module 60 and forward of the container module 20. A storage compartment 172 adjacent the service module 60b may be used for the storage of used oil filters and other supplies. Front control panels 92, 92a and 92b are shown above reel hose panels 120, 120a and 120b respectively. The air compressor 30 is not shown in FIG. 15, but is mounted conveniently behind the enclosure 170 in a position not critical to the present invention. Details of the front control panel 92 are shown in FIG. 2 and will be discussed below. While the service module control circuitry 90 and the CPU 130 (FIG. 1) are contained in the service module 60, they are shown outside the fluid flow (dashed lines) box of the service module 60 in FIG. 1 to distinguish electrical signal inputs and outputs from fluid flow lines. The service module 60 may also be installed, as noted, in a stationary mount with associated stationary tanks and compressed air supply.

Figure 12:
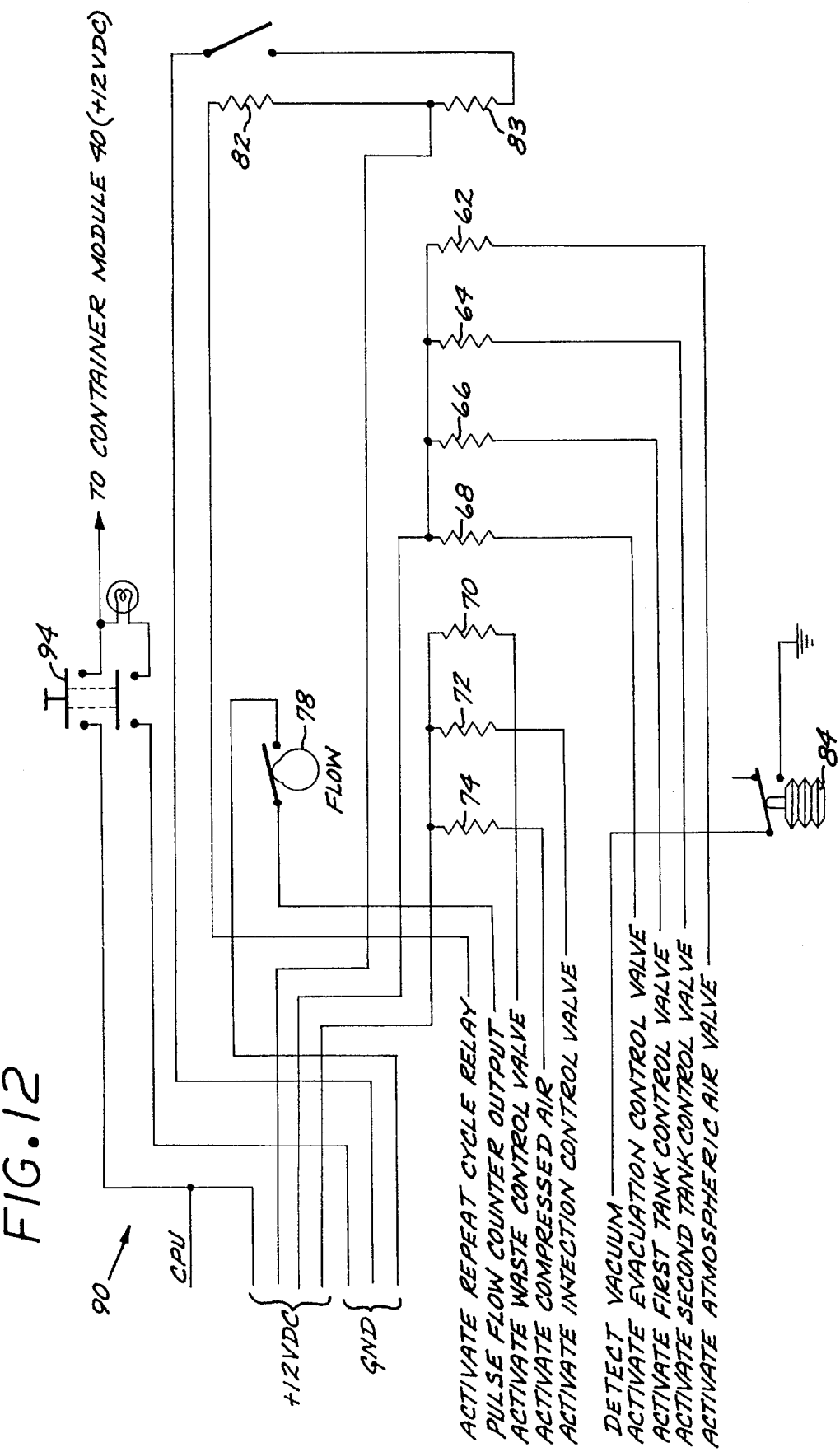
FIG. 12 is a schematic diagram illustrating control circuitry in the Service Module of FIG. 1.

The schematic and wiring diagram of FIG. 12 presents the detailed interrelationships that provide signal voltages between the above-described solenoid valves, the switches, the pump and the CPU 130. This control circuitry (shown as a block 90 in FIG. 1), accepts signal inputs from the container module system status panel 40 and the service module 60, and communicates electronically with the CPU 130 to control the operations of the service module 60 as described below.

Figure 13:
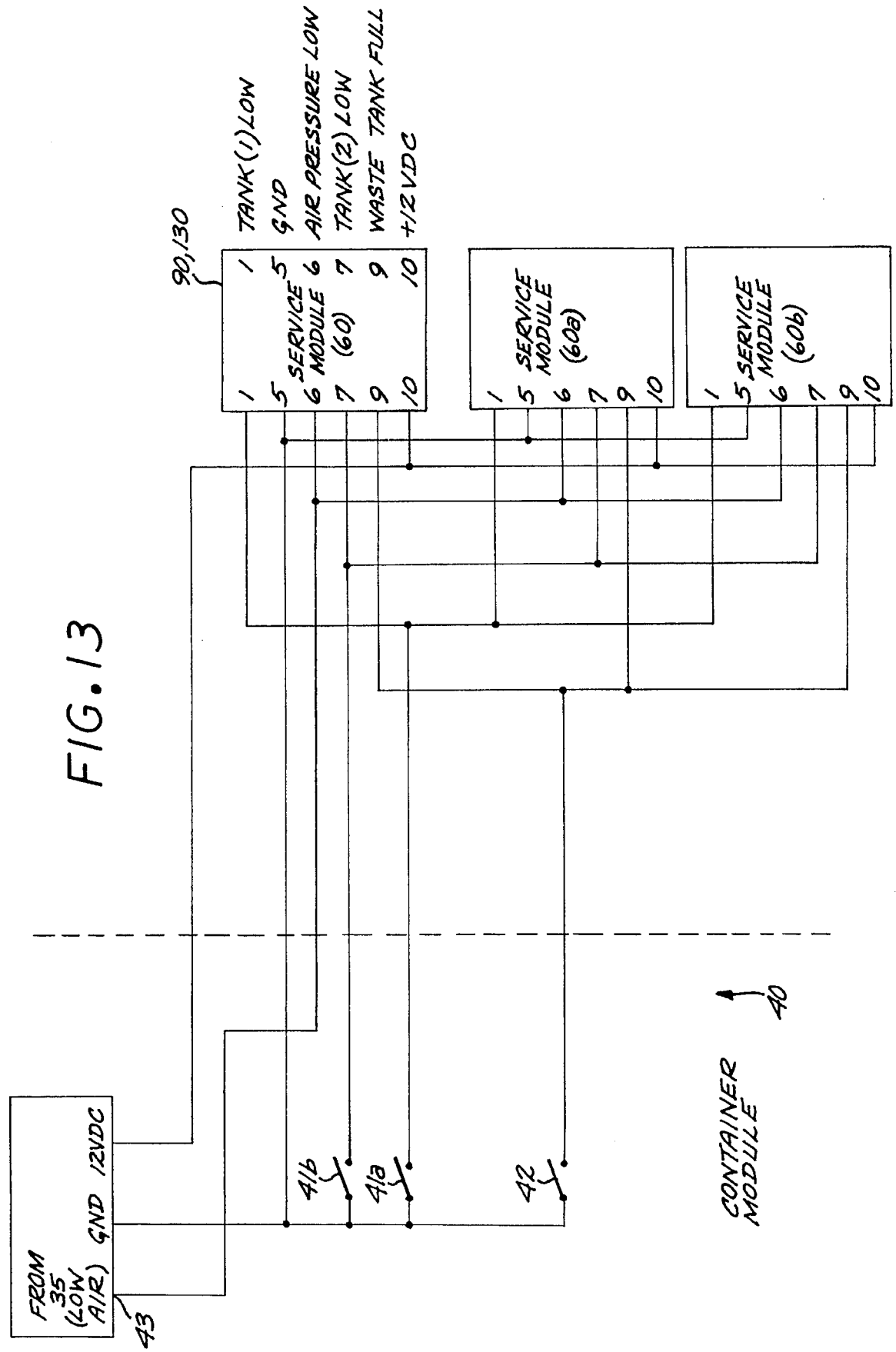
FIG. 13 is a wiring diagram illustrating status switches connected to the Container Module status terminals of FIG. 1.

The status switches providing signals to the service module control circuitry 90 are illustrated in the terminal strip 40 layout that is presented in more detail in FIG. 13. Ground, +12 volt DC power and an air pressure input signal 43 from pressure transducer 35 (FIG. 1), are brought into container module terminal strip 40, and distributed as shown in the FIG. 13 as outputs to the service module control circuits 90 and the CPU 130. Each such output from the terminal strip 40 to the service module 60 is shown to be connected in parallel to the other service modules 60a, 60b of the exemplary embodiment of this invention.

Figure 14:
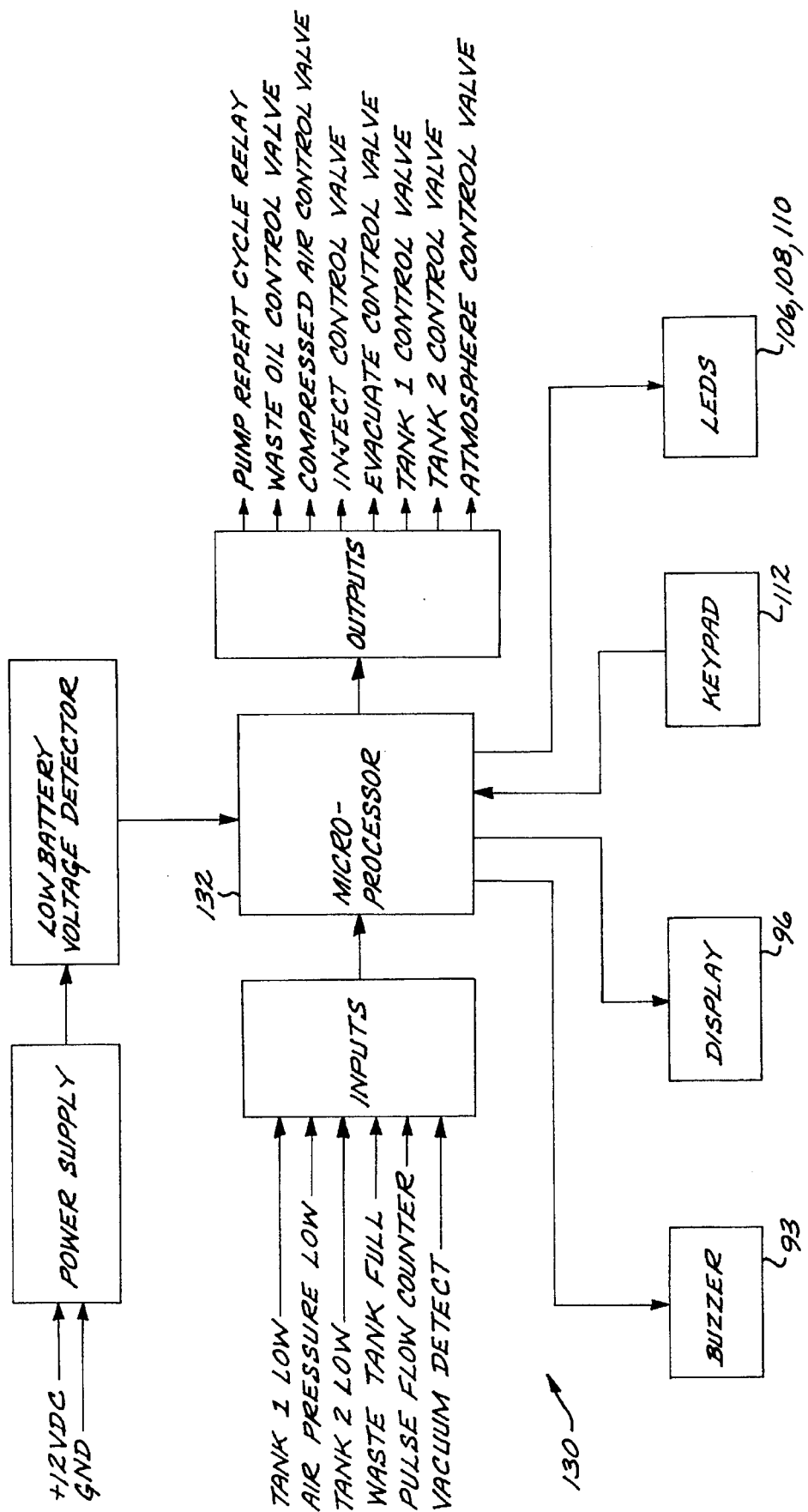
FIG. 14 is a functional block diagram illustrating major subcircuits of the Central Processing Unit of FIG. 1.

Finally, major functions of the CPU 130 are illustrated in the descriptive block diagram of FIG. 14. In FIG. 14, the CPU or microcontroller 130 comprises a microprocessor 132 programmed to accept inputs from the status switches and pulse flow meter described above, and from a keypad 112. The microprocessor 132 may be, for example, an 8031 chip supplied by Intel Corporation of Santa Clara, Calif. The microprocessor 132 and its enabling circuitry (e.g., a power supply, a low battery voltage detector, and a serial interface, which are known to those of ordinary skill in microcontroller technology) control the repeat cycle relay 82 and the control valves described above. The microprocessor 132 also provides control signals to the audible and visible indicators described below. With respect to FIGS. 2 and 14, the functions of the various switches and indicators will become apparent when the operation is discussed in the Operation section below. The switches include Power 94, Mode 98, Oil Type 100, Start 102, Stop 104 and the keypad 112, including an Enter button 114. The visible and audible indicators include a buzzer speaker 93, a display window 96, a red "Evacuate" LED 106, a yellow "Inject" LED 108 and a green "Complete" LED 110, other LED colors, of course, being equally suitable.

Operation and Fluid Flow

Complete operational sequence is diagrammed in the flow charts of FIGS. 3 through 11. FIG. 1 will be referenced when mechanical implementation of the charted sequences is discussed, and FIGS. 2 and 12–14 will assist in understanding the electrical implementation.

Figure 3:
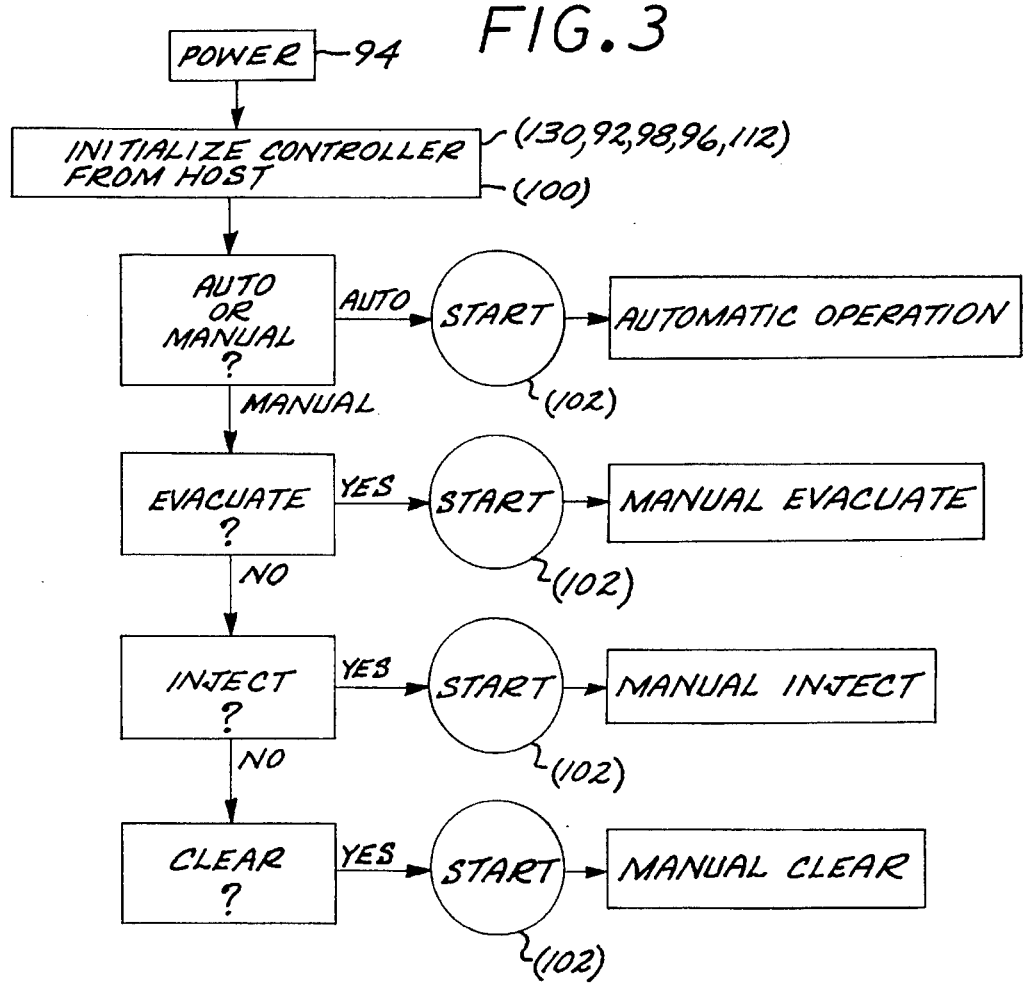
FIG. 3 is a block diagram illustrating a main overview of the manual and automatic selections available in the method of the present invention.

FIG. 3 illustrates a main flow chart from which the remaining operations proceed. An operator switches on the Power switch 94 on the control panel 92 (FIG. 2) and initializes the CPU 130 by first pressing the Mode button 98 until prompted in the display 96 to enter "oil to add quantity". Quantity in quarts (or liters) to the nearest tenth is entered via the keypad 112. When the display 96 prompts for oil type, the Type button 100 is pressed to select between fresh oil tanks 24 and 26 (FIG. 1). When the oil quantity and type have been thus initialized, the display 96 shows "Ready to Start".

For Automatic operation, if "Auto" is not already displayed in the display 96, the operator presses the Mode button 98 until "Auto" is displayed, then presses the Start button 102 to begin the Automatic Sequence to be described in connection with FIG. 4.

For Manual operation, the operator presses the Mode button 98 until "Manual" is displayed along with the particular one of three programs desired. For example, if manual evacuation of oil from an engine is desired, the display 96 is made to show "Evacuate Oil", and the Start button 102 will begin the Manual Evacuate operation of FIG. 5; for manual injection of oil from one of the tanks 24,26, the display 96 will show "Inject Oil" and pressing the Start button 102 begins the Manual Inject operation of FIG. 6; and for manual purging or clearing of the fluid lines, the display 96 will show "Clear System", and the Start button 102 is pressed to begin the Manual Clear operation of FIG. 7.

Automatic Sequence

Figure 4:
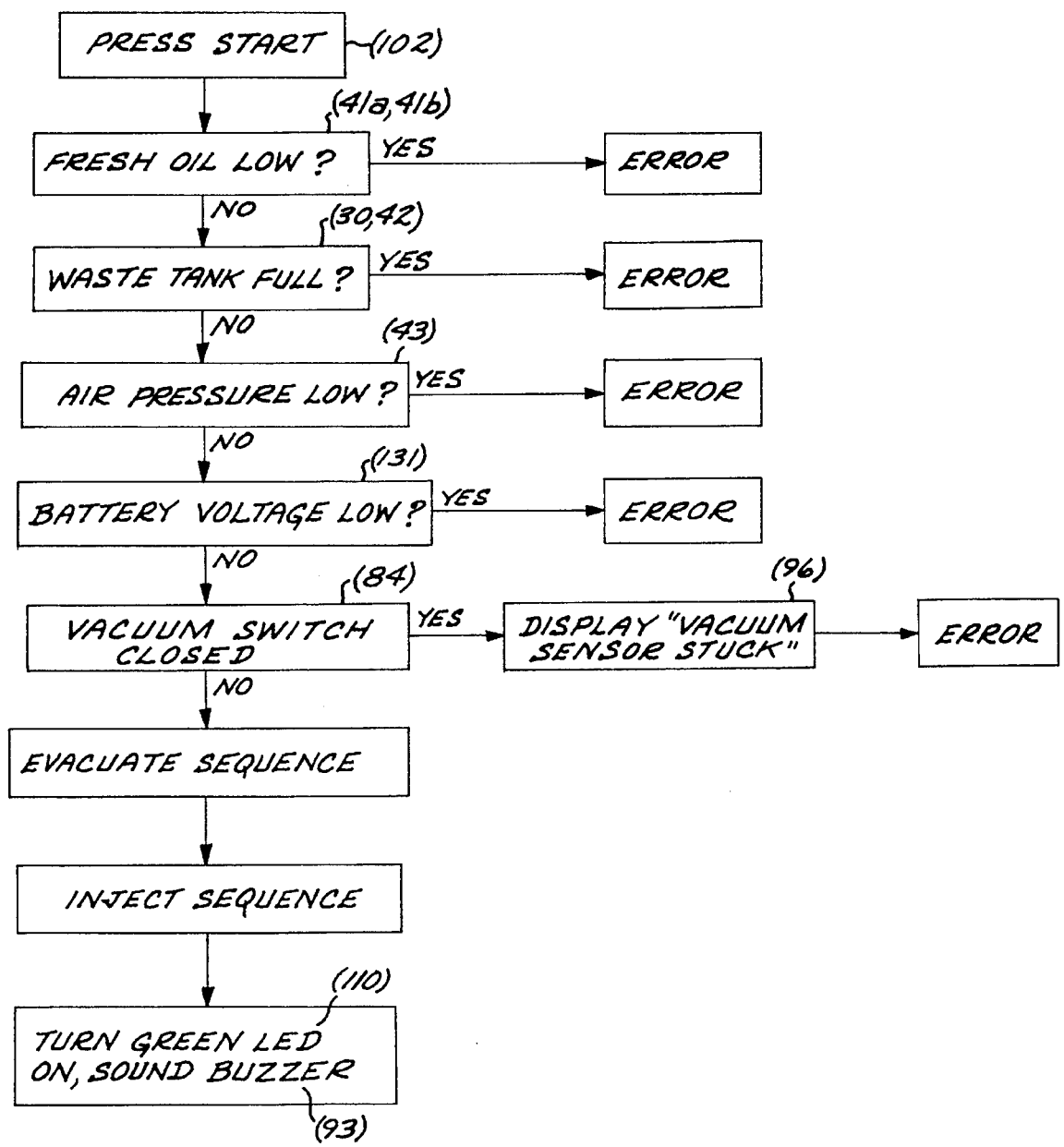
FIG. 4 is a block diagram illustrating the Automatic operation steps from the selections of FIG. 3.
Figure 11:
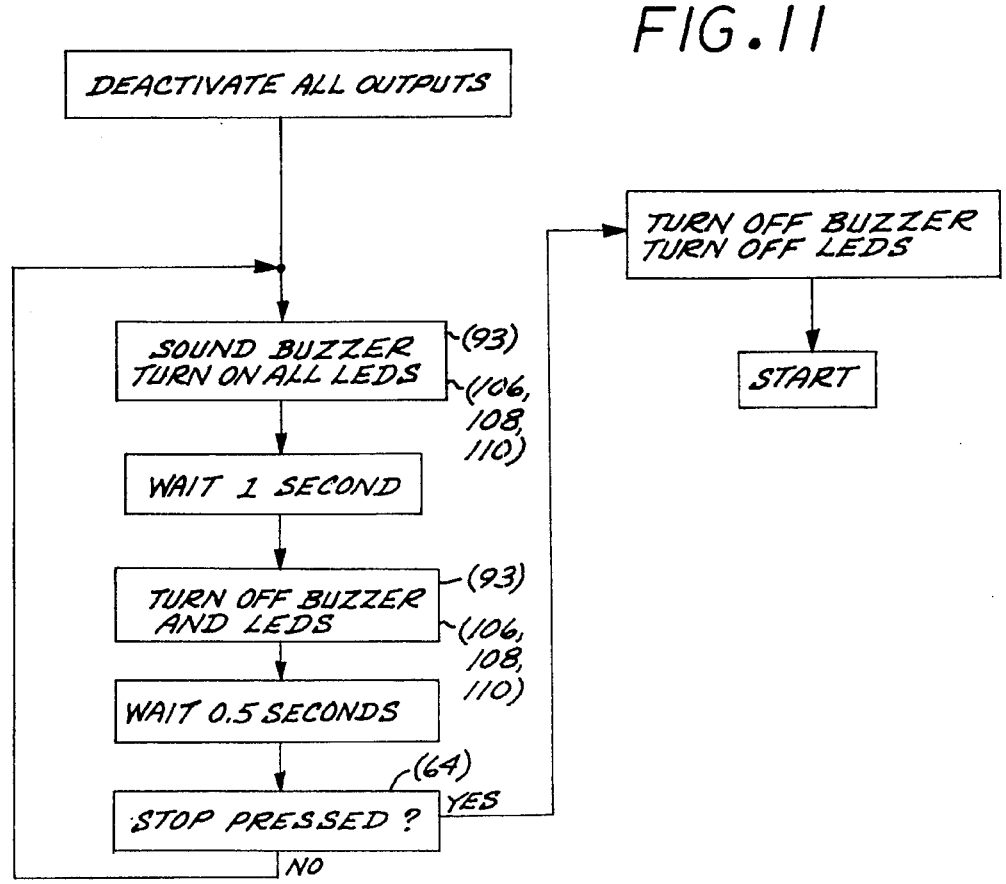
FIG. 11 is a block diagram illustrating the automatic ERROR Sequence steps from the Automatic operation of FIG. 4.

When the operator has selected "Auto" and pressed the Start button 102, the sequence of FIG. 4 is carried out. The CPU 130 samples the signals from the terminals in the status circuit 40 (FIG. 1). First the selected fresh oil tank 24 or 26 is checked for low oil. If a low oil float switch 41a or 41b in the selected tank 24 or 26, respectively, (FIGS. 1 and 13) is detected closed, the display 96 shows "Low Fresh Oil" and the ERROR sequence of FIG. 11 is executed as described below. If fresh oil is not low, the waste tank 28 is checked for being full. If a waste tank full float switch 42 is closed, the display 96 shows "Waste Tank Full" and the ERROR sequence is executed. If the waste tank 28 is not full, a pressure signal from the air compressor pressure transducer 35 (FIG. 1) to the pressure alarm terminal 43 (FIG. 13) is sampled, and if an air pressure below about 60 psi is detected, the display 96 shows "Low Air Pressure" and the ERROR sequence of FIG. 11 is executed. The check for power supply voltage level is performed by a conventional Low Battery Voltage detector circuit integral to the CPU 130. If a low voltage is detected, the display 96 shows "Low Battery" and the ERROR sequence is executed.

When all such preliminary checks have reported normal status, the Automatic Sequence performs a pre-evacuation check of the vacuum switch 84 in the service module circuitry 90 of FIG. 12. The vacuum switch 84 is set to close when subatmospheric pneumatic pressure in the manifold 69 reaches a high level of "vacuum", approximately 13"–15" Hg. The pre-evacuation check is to assure that the vacuum switch 84 is not malfunctioning. Subsequent monitoring of the vacuum switch 84 as described below is for the purpose of assuring that there are no significant leaks in the manifold 69 and the evacuation conduit 71, and that the pump 76 is performing adequately.

If the vacuum switch 84 is in a closed condition when tested in the pre-evacuation check, a "Vacuum Sensor Stuck" message is displayed on the display window 96 and the ERROR sequence of FIG. 11 is executed. If instead, vacuum switch 84 is detected open, i.e., no vacuum is present in the fluid input to the pump 76, the EVACUATE sequence of FIG. 8, described below, is commenced to extract spent oil from the engine 152.

Figure 9:
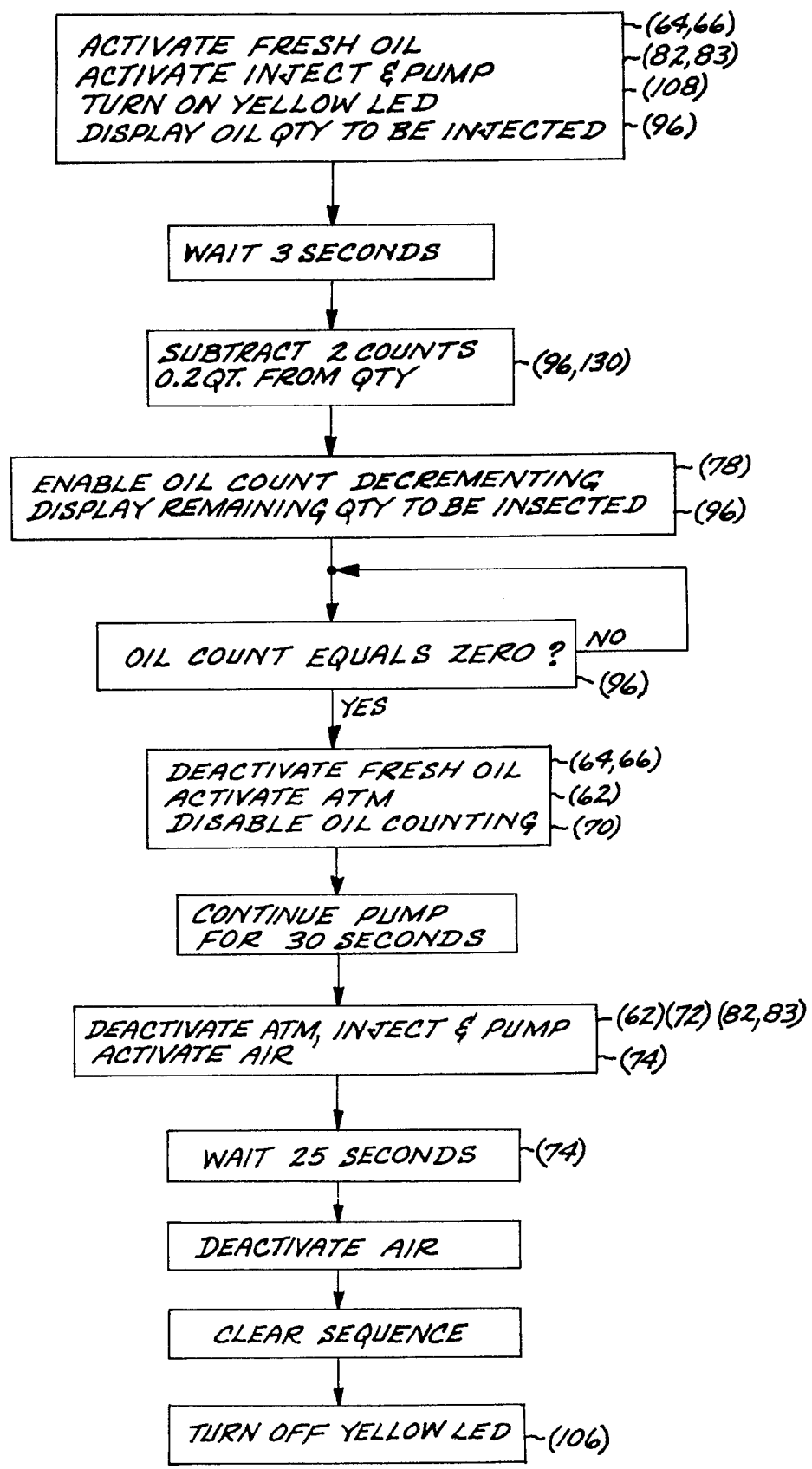
FIG. 9 is a block diagram illustrating the automatic INJECT Sequence steps from the Automatic operation of FIG. 4.

After the EVACUATE sequence is complete, the INJECT sequence of FIG. 9 is executed to deliver fresh oil to the engine 152. Once the INJECT sequence is complete, the "Complete" LED 110 is illuminated and a buzzer sounds from the speaker 93 for a short period of time, e.g., one second The display 96 shows "Done", and the system pauses for the operator to press the Stop button 104.

Manual Evacuate, Inject and Clear

Figure 5:
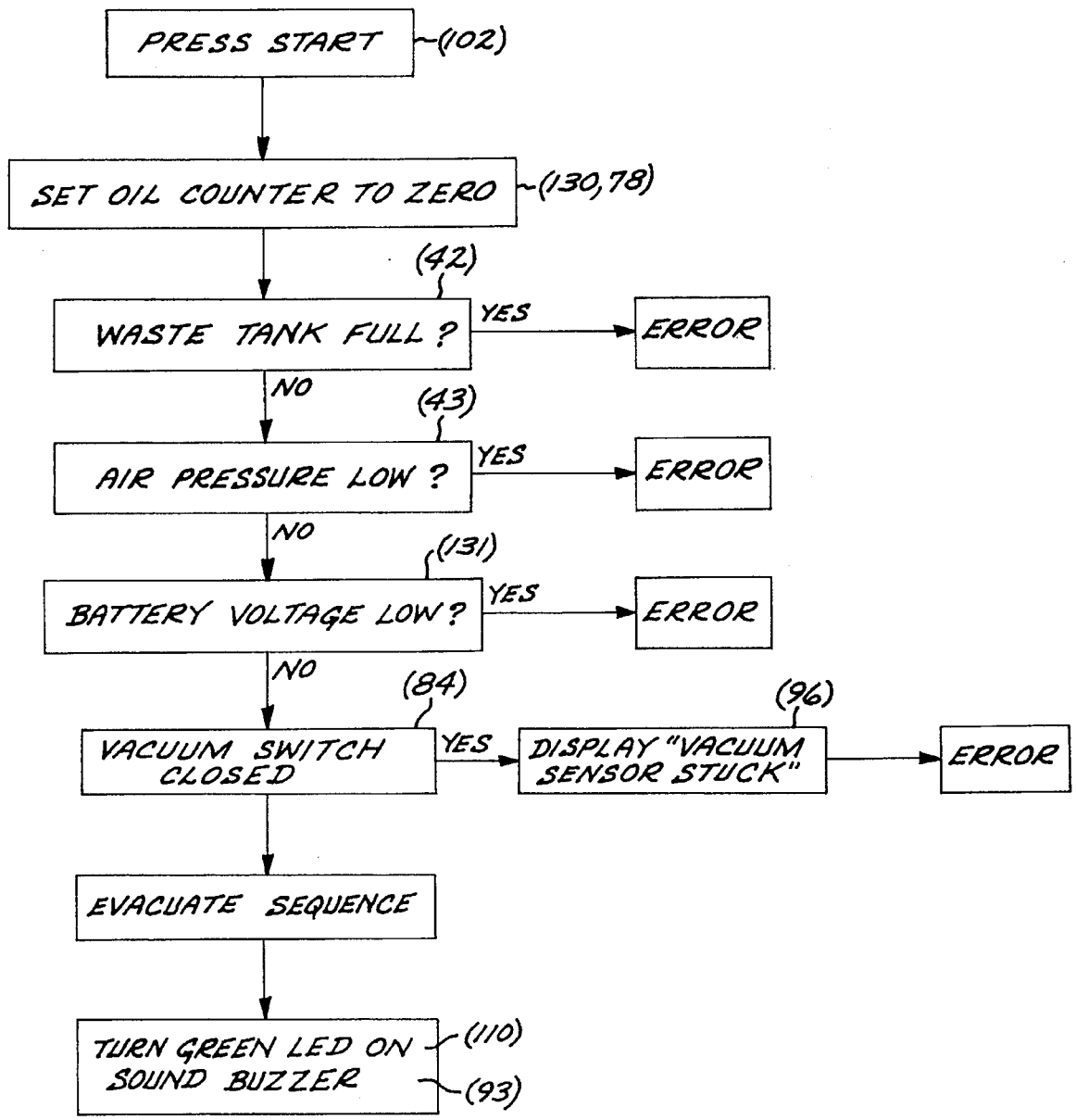
FIG. 5 is a block diagram illustrating the Manual-Evacuate operation steps from the selections of FIG. 3.
Figure 8:
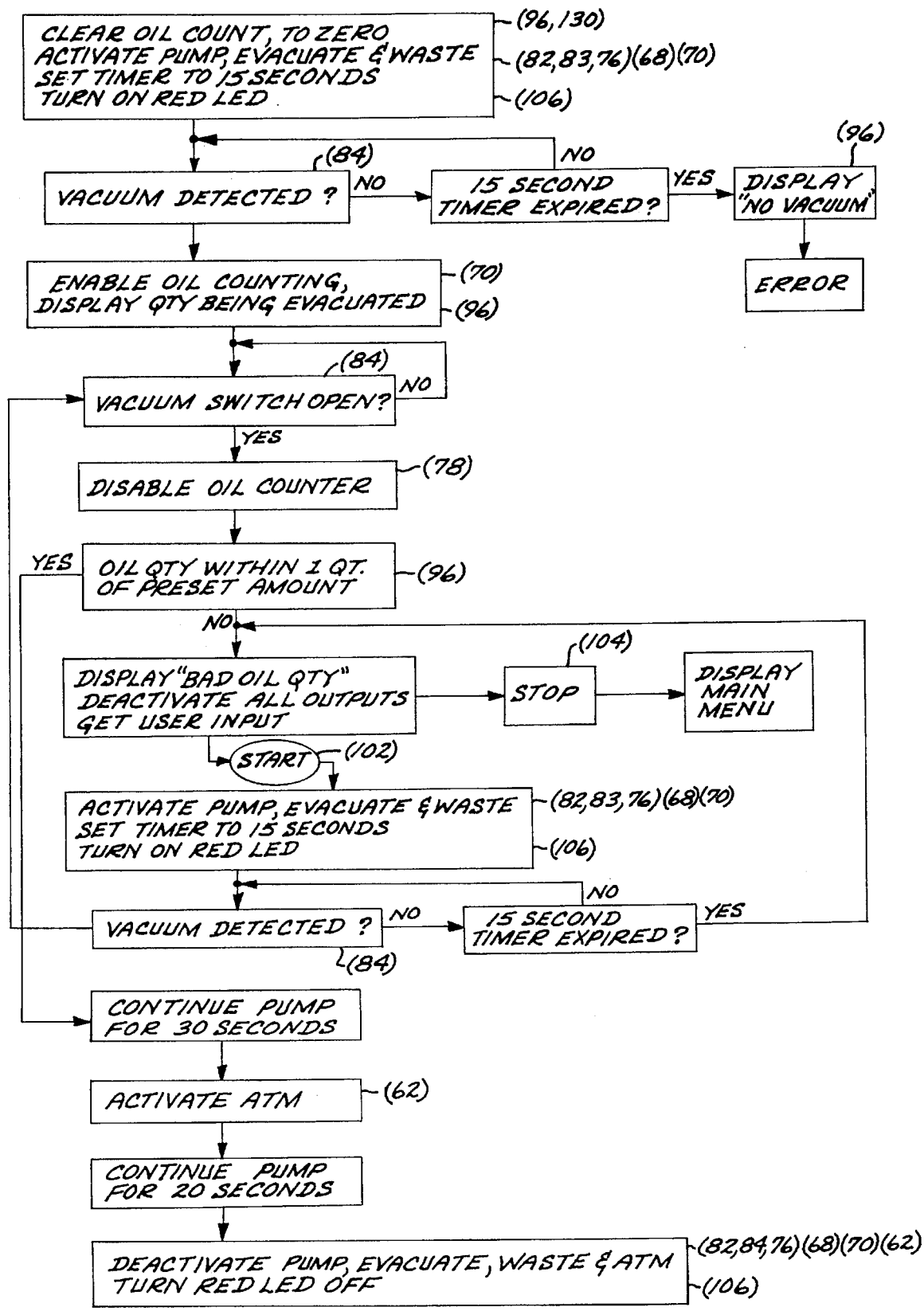
FIG. 8 is a block diagram illustrating the automatic EVACUATION Sequence steps from the Automatic operation of FIG. 4.

Referring now to FIG. 5, for manual evacuation of spent oil, when the operator presses the Start button 102, the CPU 130 resets the "oil add quantity" to zero, and the status checks for Waste Tank Full, Low Air Pressure, Low Battery Voltage, and Vacuum Sensor Stuck are made as described above. If the system passes all the status checks, the EVACUATE sequence of FIG. 8 is executed, the "complete" LED 110, the buzzer speaker 93 and the display 96 are activated, and the operator is prompted to press the Stop button 104.

Figure 6:
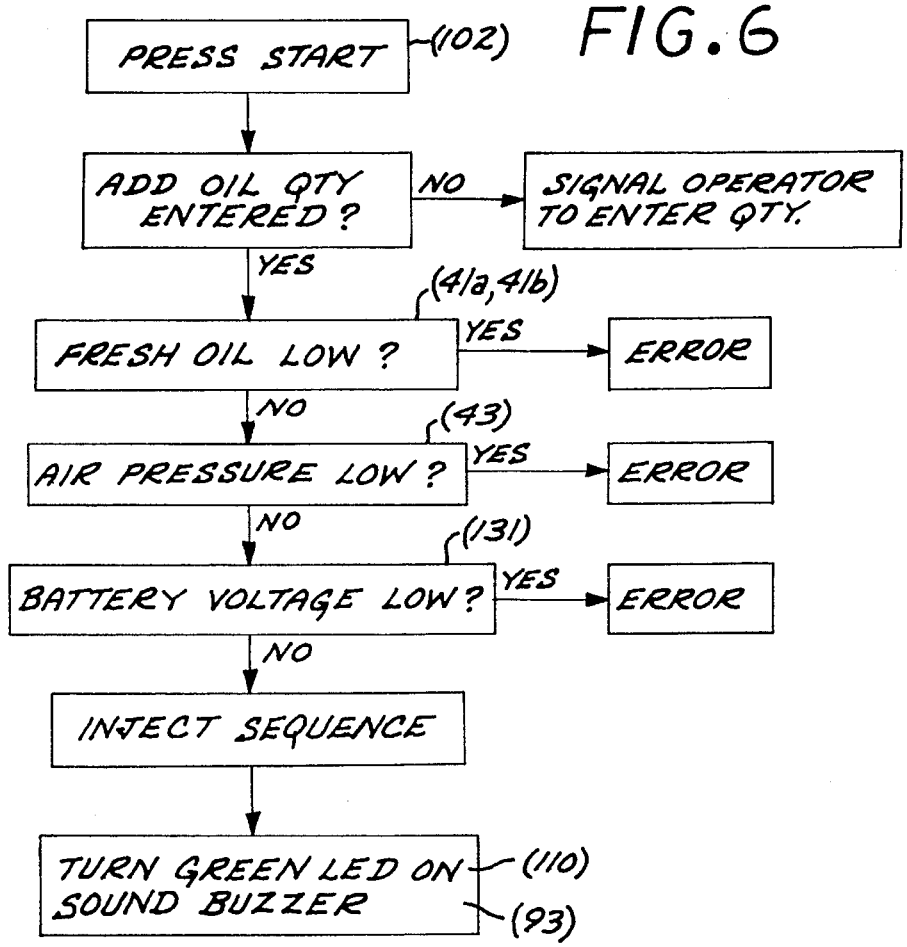
FIG. 6 is a block diagram illustrating the Manual-Inject operation steps from the selections of FIG. 3.

FIG. 6 shows a similar chart for manual injection of new oil. Here, "add oil quantity" is checked by the CPU 130 to make sure an amount has been entered. If not, the operator must enter an oil 1.0 amount via the keypad 112 before the sequence will continue.

The status checks for Low Fresh Oil, Low Air Pressure, Vacuum Sensor Stuck, and Low Battery are made as discussed above, and if passed successfully, the INJECTION sequence of FIG. 9 is executed and the operator is signalled as previously noted to press the Stop button 104.

Figure 7:
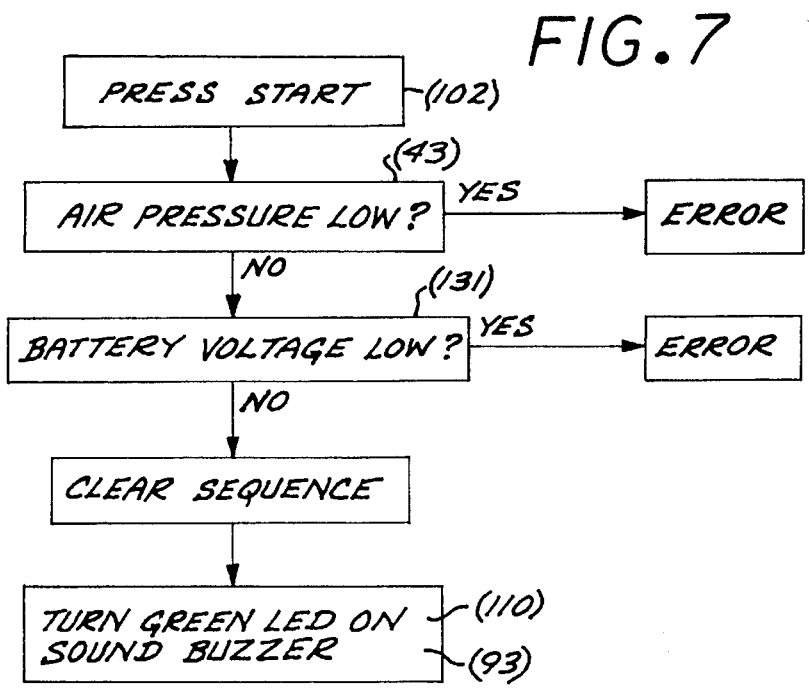
FIG. 7 is a block diagram illustrating the Manual-Clear operation steps from the selections of FIG. 3.
Figure 10:
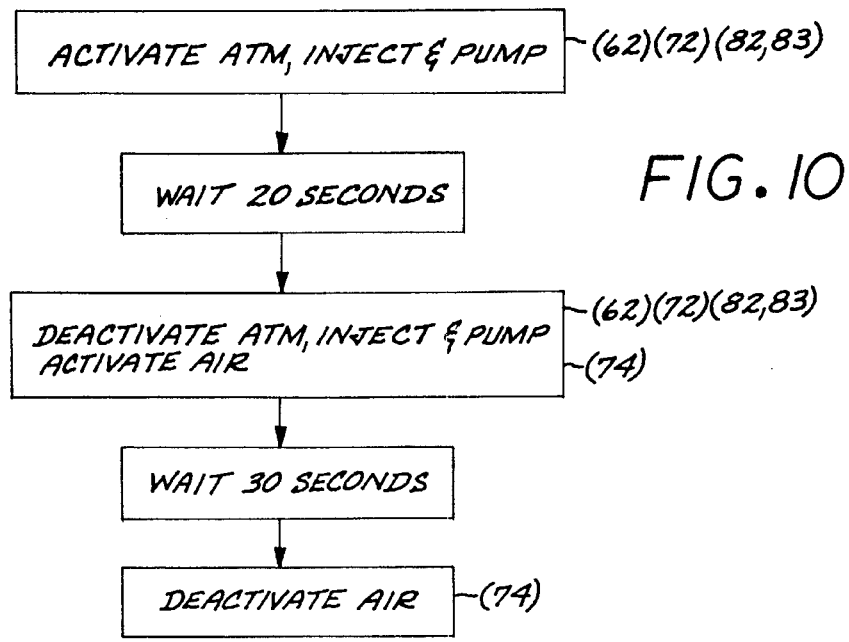
FIG. 10 is a block diagram illustrating the automatic CLEAR Sequence steps from the Manual Clear operation of FIG. 7.

For the Manual Clear operation, refer to FIG. 7. After successful tests for air pressure and battery level, the CLEAR sequence of FIG. 10 is executed, and the completion indicators are activated as before.

The following subroutines are fully automated, with operator involvement required only in the event of a system error. Reference to FIGS. 1,2 and 12 will be helpful to assimilate the mechanical and electrical implementation of the EVACUATE sequence steps as well as the steps of the INJECT, CLEAR and ERROR sequences to follow. The EVACUATION sequence is a subroutine of both Automatic Operation and Manual Evacuate Operation as described above. The INJECT sequence is a subroutine of both Automatic Operation and Manual Inject Operation. The CLEAR sequence is a subroutine of the Manual Clear Operation and INJECT sequence (and thus a sub-subroutine of Automatic Operation), and the ERROR sequence is a subroutine of all of the above except itself and the CLEAR sequence.

EVACUATE Sequence

FIG. 8 illustrates the automated events controlling the valves and fluid flow in the service module 60 for the EVACUATE sequence. The oil count is cleared to zero by the CPU 130 on the display 96. The Evacuation valve 68 and the waste control valve 70 are opened to clear a fluid path from the reel hose 77 through the evacuation conduit 71, the pump 76 and the waste conduit 75 to the waste tank 28 (FIG. 1). The pump 76 is activated by signalling a repeat cycle relay 82 controlling the pump valve 83 to begin establishing subatmospheric pneumatic pressure (vacuum) in the last mentioned fluid path to draw spent oil via the connector hose 160 or dipstick tubing 164 through the reel hose 77. The "Evacuate" LED 106 is illuminated, signifying evacuation in progress. If, after a predetermined interval of about 15 seconds, the vacuum switch 84 (FIG. 12) does not close, i.e., if a vacuum of at least 13"–15" Hg is not detected in the manifold 69 and the evacuation conduit 71, the display window 96 displays a "No Vacuum" error message, signifying possible leaks in the system or a faulty pump 76, and the ERROR sequence of FIG. 11 is executed.

If a presence of sufficient vacuum is detected within the vacuum test interval, the flow meter 78 is enabled and the display 96 shows the quantity of oil being evacuated. The flow meter 78 is not started until the proper level of vacuum is detected, to avoid false counts due to airflow through the meter. The flow meter 78 will thus generate an output signal only when fluid oil, not air, is flowing in the pump 76. When fluid oil flow stops, the "vacuum" disappears, and the flow meter 78 is disabled.

In a Quantity comparison sub-sequence beginning with the "Vacuum Switch On?" test of FIG. 8, the system waits for the vacuum switch 84 to signal vacuum disappearance, then disables the flow meter 78 and compares the displayed oil count with the preset "oil add quantity" in the CPU 130.

If the Display 96 count is less than one quart (or one liter for metric applications) below the preset amount, the system flushes the evacuation-related conduits 77,79,71 and 75, the pump 76 and the flow meter 78 of residual oil by continuing to run the pump 76 for 30 seconds and then opens the atmospheric air valve 62 to admit unpressurized air to input manifold 69 for 20 seconds, during which time the manifold 69, the evacuation line 71 and the waste conduit 75 are cleared. All open valves (the pump valve 83, the evacuate valve 68, the waste valve 70 and the atmospheric air valve 62) are then closed, and the EVACUATE LED 106 is turned off.

If, on the other hand, the gap between oil evacuated as counted on display 96 and oil quantity as preset in CPU 130 exceeds one quart (or one liter), a User Input sub-sequence is executed wherein all valves are closed, a "Bad Oil Quantity" message is displayed in the display window 96, the EVACUATE LED 106 is extinguished, and the system pauses for operator input. If the Stop button 104 is pressed, the system idles and the starting menu is shown in the display window 96. If the Start button 102 is pressed, the pump valve 83, the evacuation control valve 68 and the waste valve 70 are once more opened, the EVACUATE LED is turned back on, and the display 96 continues to show the quantity of oil evacuated so far.

If inadequate "vacuum" is detected after the vacuum test interval has elapsed, the sequence returns to the User Input sub-sequence including the "Bad Oil Quantity" message display described above.

If adequate "vacuum" is detected within the vacuum test interval, the system attempts again to complete the evacuation sequence by returning to the Quantity Comparison sub-sequence previously described.

INJECT Sequence

FIG. 9 illustrates the automated events controlling the valves and fluid flow in the service module 60 for the INJECT sequence. The "add oil quantity" count is provided by the CPU 130 to the display 96. A selected one of the fresh oil valves 64, 66 and the injection valve 72 are opened to clear a fluid path from reel hose 77 through the injection conduit 73, the pump 76 and the manifold 69 from the fresh oil tank 24 or 26 to the crankcase 154 via the connector hose 160 or the dipstick tubing 164 (FIG. 1). The pump 76 is activated by signalling the repeat cycle relay 82 controlling the pump valve 83 to begin creating a pressure to force fresh oil through the manifold 69, and the "Inject" LED 108 is illuminated, signifying injection in progress. Fresh fluid oil flow through the flow meter 78 is almost immediate, because the fresh oil tank control valves 64,66 are located in close proximity (less than one foot) from the input to the pump 76. Thus, since virtually no time for buildup of vacuum is required, after a short delay (e.g., about 3 seconds), two counts (0.2 quarts, or 0.2 liters) are subtracted from the "add oil quantity", and the display window 96 displays the remaining oil quantity to be injected. (The two counts represent the quantity of oil remaining in the injection line 73 after the flow meter 78 is disabled. This quantity is delivered to the crankcase 154 at the end of the injection operation, while the pump 76 is still running but the flow meter 78 is turned off).

The flow meter 78 is then enabled and the display 96 continues to monitor the quantity of oil being injected into the engine 152. When the quantity in the display 96 reaches zero, the CPU 130 then disables the flow meter 78, closes the selected fresh oil valve 64 or 66, and opens the atmospheric air valve 62 to allow air and the oil that has flowed through the flow meter 78 but as yet is undelivered to the crankcase 154, to be pumped through the injection conduit 73 and the appropriate connector line 160 or 164. After an interval of about 30 seconds, the atmospheric air valve 62, the injection valve 72 and the pump valve 83 are closed, and the compressed air valve 74 is opened for about 25 seconds, during which time the reel hose 77 and the selected connector line 160 or 164, whichever is used, are flushed. The compressed air valve 74 is then closed, the CLEAR Sequence, described below, is executed as the final step of the INJECT sequence, and the "Inject" LED 108 is turned off.

CLEAR Sequence

Referring to FIG. 10, the CPU 130 executes the CLEAR sequence to clear the system lines of oil after the various operations in the following manner. The atmospheric air valve 62, the injection valve 72 and the pump valve 83 are opened, and the pump 76 is allowed to run for a clearance interval of about 20 seconds, after which all three valves are closed. The compressed air valve 74 is then opened for a purge interval of about 30 seconds and then closed, the reel hose 77 and the connector line 160 or 164 having been purged.

ERROR Sequence

Audible and visible alarms to alert an operator to a condition that requires operator input are described in the flow chart of FIG. 11. All valves are deactivated. The LEDs 106, 108, 110 are illuminated and the buzzer sounds from the speaker 93, all for one second out of every one and one-half seconds until an operator presses the Stop button 104.

Although an exemplary embodiment of the invention has been described for the purposes of illustrating the features thereof, it will be appreciated that a number of variations and modifications may suggest themselves to those skilled in the pertinent arts. Such variations and modifications are considered within the spirit and scope of the invention as defined in the claims that follow.

What is claimed is:

1. A method of evacuating used lubricating fluid from the crankcase of an internal combustion engine and supplying fresh lubricating fluid thereto, wherein the crankcase is accessible through a plurality of orifices, the method comprising the steps of:

(a) introducing a conduit into the crankcase through one of the orifices;

(b) evacuating the used lubricating fluid from the crankcase through the conduit by applying subatmospheric pressure to the crankcase through the conduit;

(c) at least periodically measuring the volume of lubricating fluid evacuated from the crankcase and comparing the measured evacuated volume with a preset evacuated volume value;

(d) when the measured evacuated volume value substantially equals the preset evacuated volume value, ceasing the application of the subatmospheric pressure to the crankcase;

(e)(1) providing a plurality of source receptacles each containing fresh lubricating fluid;

(e)(2) selecting one of the plurality of source receptacles;

(e)(3) providing fluid communication from the selected source receptacle under positive pressure to the conduit;

(e)(4) injecting a supply of fresh lubricating fluid into the crankcase under positive pressure through the conduit;

(f) at least periodically measuring the volume of lubricating fluid injected into the crankcase and comparing the measured injected volume with a preset injected volume value; and (g) ceasing the step of injecting when the measured injected volume substantially equals a predetermined proportion of the preset injected volume value.

2. The method of claim 1, wherein the step of evacuating includes the step of directing the used lubricating fluid from the conduit into a closed waste receptacle substantially without exposure of the used lubricating fluid to the ambient environment.

3. The method of claim 2, further comprising the steps of:

(h) clearing residual fresh lubricating fluid from the conduit by providing gas under positive pressure through the conduit; and (i) removing the conduit from the crankcase.

4. The method of claim 3, wherein the clearing step comprises the steps of:

(h)(1) pumping the atmospheric air under positive pressure through the conduit for a first time period;

(h)(2) providing a supply of compressed gas; and (h)(3) after the first time period has elapsed, providing a flow of the compressed gas through the conduit from the compressed gas supply for a second time period.

5. The method of claim 2, wherein the step of evacuating comprises the steps of:

(b)(1) determining if the volume of used lubricating fluid in the waste receptacle exceeds a preset waste volume limit; and (b)(2) if the volume of used lubricating fluid in the waste receptacle is less than the preset waste volume limit, applying the subatmospheric pressure and otherwise, activating an alarm.

6. The method of claim 1, wherein the step of selecting comprises:

(e)(2)(i) determining if the volume of fresh lubricating fluid in the selected source receptacle is less than a preset source volume limit; and (e)(2)(ii) if the volume of the fresh lubricating fluid in the selected source receptacle is not less than the preset source volume limit, injecting the fresh lubricating fluid into the crankcase from the selected source receptacle, and otherwise, activating an alarm.

7. The method of claim 1, wherein the step of evacuating comprises:

(b)(1) determining if a subatmospheric pneumatic pressure in the conduit is less than a preset subatmospheric pressure value;

(b)(2) if the subatmospheric pressure in the conduit is less than the preset pressure value, continuing to apply subatmospheric pressure to the conduit for a preset time period; and (b)(3) if after the preset time period has elapsed, subatmospheric pressure is not less than the preset pressure value, evacuating the used lubricating fluid from the crankcase and otherwise, activating an alarm.

8. The method of claim 1 further comprising the steps of:

providing a compressed gas actuated pump for performing the evacuating and injecting steps;

providing a supply of compressed gas;

determining if the compressed gas supply pressure is less than a preset compressed gas pressure value; and if the compressed gas supply pressure is not less than the preset pressure limit, continuing the evacuating and injecting steps and otherwise, activating an alarm.

9. The method of claim 4 wherein the step of providing a supply of compressed gas comprises the steps of:

determining if the compressed gas supply pressure is less than a preset compressed gas pressure value; and if the compressed gas supply pressure is not less than the preset pressure value, providing a flow of compressed gas for the second time period and otherwise, activating an alarm.

10. The system of claims 1, 6, 7 or 8 further comprising the steps of:

providing a central processing unit (CPU) programmed to conduct, monitor and control the steps of evacuation, injecting, measuring, ceasing and activating an alarm;

(i) initiating the CPU by selecting one of the source receptacles and entering the preset evacuated volume value and injected volume value, and (j) initiating the programmed operation of the CPU.

11. A method of evacuating used lubricating fluid from the crankcase of an internal combustion engine and supplying fresh lubricating fluid thereto, wherein the crankcase is accessible through a plurality of orifices, the method comprising the steps of:

(a) introducing a conduit into the crankcase through one of the orifices;

(b) evacuating the used lubricating fluid from the crankcase through the conduit by applying subatmospheric pressure to the crankcase through the conduit;

(c) at least periodically measuring the volume of lubricating fluid evacuated from the crankcase and comparing the measured evacuated volume with a preset evacuated volume value;

(d) when the measured evacuated volume value substantially equals the preset evacuated volume value, ceasing the application of the subatmospheric pressure to the crankcase;

(e) injecting a supply of fresh lubricating fluid into the crankcase under positive pressure through the conduit;

(f) at least periodically measuring the volume of lubricating fluid injected into the crankcase and comparing the measured injected volume with a preset injected volume value;

(g) ceasing the step of injecting when the measured injected volume substantially equals the preset injected volume value; and (h) clearing residual fresh lubricating fluid from the conduit by performing the steps of:

(h)(1) pumping air under positive pressure through the conduit for a first time period; and (h)(2) after the first time period has elapsed, providing a flow of compressed gas through the conduit from a compressed gas supply for a second time period.

12. The method of claim 11, wherein the step of injecting comprises the steps of:

(e)(1) providing a plurality of source receptacles each containing fresh lubricating fluid;

(e)(2) selecting one of the plurality of source receptacles; and (e)(3) providing fluid communication from the selected source receptacle under positive pressure to the conduit.

13. The method of claim 11, wherein the step of injecting comprises the steps of:

(e)(1) providing a source receptacle containing fresh lubricating fluid;

(e)(2) determining if the volume of fresh lubricating fluid in the source receptacle is less than a preset source volume limit; and (e)(3) if the volume of the fresh lubricating fluid in the source receptacle is not less than the preset source volume limit, injecting the fresh lubricating fluid into the crankcase from the source receptacle and otherwise, activating an alarm.

14. The method of claim 11, wherein the step of evacuating comprises the steps of:

(b)(1) directing the used lubricating fluid from the conduit into a closed waste receptacle;

(b)(2) determining if the volume of the used lubricating fluid in the waste receptacle exceeds a preset waste volume limit; and (b)(3) applying the subatmospheric pressure only if the volume of the used lubricating fluid in the waste receptacle is less than the preset waste volume limit.

15. The method of claim 11, wherein the step of injecting comprises the steps of;

(e)(1) providing a source receptacle containing fresh lubricating fluid;

(e)(2) determining if the volume of fresh lubricating fluid in the source receptacle is less than a preset source volume limit; and (e)(3) injecting the fresh lubricating fluid into the crankcase from the source receptacle only if the volume of the fresh lubricating fluid in the source receptacle is not less than the preset source volume limit.

16. The method of claim 11, wherein the step of evacuating comprises:

(b)(1) determining if a subatmospheric pressure in the conduit is less than a preset subatmospheric pressure value;

(b)(2) if the subatmospheric pressure in the conduit is less than the preset pressure value, continuing to apply subatmospheric pressure to the conduit for a preset evacuation time period; and (b)(3) evacuating the used lubricating fluid from the crankcase only if, after the preset evacuation time period has elapsed, the subatmospheric pressure is not less than the preset pressure value.

17. The method of claim 11, wherein the step of providing a flow of compressed gas comprises the steps of:

(h)(2)(i) determining if the compressed gas supply pressure is less than a preset gas supply pressure value; and (h)(2)(ii) providing the flow of compressed gas for the second time period only if the compressed gas supply pressure is not less than the preset compressed gas pressure value.

18. The method of claim 12, wherein the step of selecting comprises the steps of:

(e)(2)(i) determining if the volume of fresh lubricating fluid in the selected source receptacle is less than a preset source volume limit; and (e)(2)(ii) injecting the fresh lubricating fluid into the crankcase from the selected source receptacle only if the volume of the fresh lubricating fluid in the selected source receptacle is not less than the preset source volume limit.

19. A method of evacuating used lubricating fluid from the crankcase of an internal combustion engine and supplying fresh lubricating fluid thereto, wherein the crankcase is accessible through a plurality of orifices, the method comprising the steps of:

(a) introducing a conduit into the crankcase through one of the orifices;

(b) evacuating the used lubricating fluid from the crankcase through the conduit by applying subatmospheric pressure to the crankcase through the conduit;

(c) at least periodically measuring the volume of lubricating fluid evacuated from the crankcase and comparing the measured evacuated volume with a preset evacuated volume value;

(d) when the measured evacuated volume value substantially equals the preset evacuated volume value, ceasing the application of the subatmospheric pressure to the crankcase;

(e) injecting a supply of fresh lubricating fluid into the crankcase under positive pressure through the conduit;

(f) at least periodically measuring the volume of lubricating fluid injected into the crankcase and comparing the measured injected volume with a preset injected volume value; and (g) ceasing the step of injecting when the measured injected volume substantially equals the preset injected volume value;

wherein the evacuating and injecting steps are performed by a compressed gas-actuated pump operated from a compressed gas supply; and wherein the method comprises the further steps of:

determining if the compressed gas supply pressure is less than a preset pressure value; and continuing the evacuating and injecting steps only if the compressed gas supply pressure is not less than the preset pressure value.

20. The method of claim 19, further comprising the steps of:

(h) clearing residual fresh lubricating fluid from the conduit by performing the steps of:

(h)(1) pumping air under positive pressure through the conduit for a first time period; and (h)(2) after the first time period has elapsed, providing a flow of compressed gas through the conduit from a compressed gas supply for a second time period.

21. The method of claim 19, wherein the step of evacuating comprises the steps of:

(b)(1) directing the used lubricating fluid from the conduit into a closed waste receptacle;

(b)(2) determining if the volume of the used lubricating fluid in the waste receptacle exceeds a preset waste volume limit; and (b)(3) applying the subatmospheric pressure only if the volume of the used lubricating fluid in the waste receptacle is less than the preset waste volume limit.

22. The method of claim 19, wherein the step of injecting comprises the steps of;

(e)(1) providing a source receptacle containing fresh lubricating fluid;

(e)(2) determining if the volume of fresh lubricating fluid in the source receptacle is less than a preset source volume limit; and (e)(3) injecting the fresh lubricating fluid into the crankcase from the source receptacle only if the volume of the fresh lubricating fluid in the source receptacle is not less than the preset source volume limit.

23. The method of claim 19, wherein the step of evacuating comprises:

(b)(1) determining if a subatmospheric pressure in the conduit is less than a preset subatmospheric pressure value;

(b)(2) if the subatmospheric pressure in the conduit is less than the preset pressure value, continuing to apply subatmospheric pressure to the conduit for a preset evacuation time period; and (b)(3) evacuating the used lubricating fluid from the crankcase only if, after the preset evacuation time period has elapsed, the subatmospheric pressure is not less than the preset pressure value.

24. The method of claim 19, wherein the step of injecting further comprises the steps of:

(e)(1) providing a plurality of source receptacles, each containing fresh lubricating fluid;

(e)(2) selecting one of the plurality of source receptacles; and (e)(3) providing fluid communication from the selected source receptacle under pressure to the conduit.

25. The method of claim 24, wherein the step of selecting comprises the steps of:

(e)(2)(i) determining if the volume of fresh lubricating fluid in the selected source receptacle is less than a preset source volume limit; and (e)(2)(ii) injecting the fresh lubricating fluid into the crankcase from the selected source receptacle only if the volume of the fresh lubricating fluid in the selected source receptacle is not less than the preset source volume limit.

* * * * *